US012609358B2

(12) United States Patent
Yu

(10) Patent No.: US 12,609,358 B2
(45) Date of Patent: Apr. 21, 2026

(54) SECONDARY BATTERY AND METHOD FOR MANUFACTURING THE SAME

(71) Applicant: LG ENERGY SOLUTION, LTD., Seoul (KR)

(72) Inventor: Sung Hoon Yu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 812 days.

(21) Appl. No.: 17/784,800

(22) PCT Filed: Dec. 21, 2020

(86) PCT No.: PCT/KR2020/018748
§ 371 (c)(1),
(2) Date: Jun. 13, 2022

(87) PCT Pub. No.: WO2021/230455
PCT Pub. Date: Nov. 18, 2021

(65) Prior Publication Data
US 2023/0028018 A1    Jan. 26, 2023

(30) Foreign Application Priority Data

May 11, 2020    (KR) ........................ 10-2020-0056068

(51) Int. Cl.
*H01M 10/0583*      (2010.01)
*H01M 50/105*       (2021.01)

(52) U.S. Cl.
CPC ..... *H01M 10/0583* (2013.01); *H01M 50/105* (2021.01)

(58) Field of Classification Search
CPC ........... H01M 50/105; H01M 10/0459; H01M 10/0583; H01M 50/46; H01M 50/463; H01M 50/55
See application file for complete search history.

(56) References Cited

U.S. PATENT DOCUMENTS

2002/0106555 A1*    8/2002  Langan ............... H01M 50/121
                                                              29/730
2007/0105014 A1      5/2007  Shin et al.
(Continued)

FOREIGN PATENT DOCUMENTS

CN      209461545 U    10/2019
EP      3 531 488 A1    8/2019
(Continued)

OTHER PUBLICATIONS

English Translation of Kim, WO-2014017864-A1.*
(Continued)

*Primary Examiner* — Niki Bakhtiari
*Assistant Examiner* — Ryan K. Blackwell-Rudasill
(74) *Attorney, Agent, or Firm* — Birch, Stewart, Kolasch & Birch, LLP

(57)          ABSTRACT

A method for manufacturing a secondary battery includes manufacturing an electrode assembly having a stacked structure in which a negative electrode, an individual layer of a separator, a positive electrode, and an individual layer of the separator are repeated by alternately inserting the positive electrode and the negative electrode between the adjacent individual layers of the separator. Fold lines are formed on the separator at a predetermined interval, and the separator is folded in a zigzag shape along a vertical direction by the fold lines to form the plurality of individual layers; inserting the electrode assembly into a pouch; and discharging a gas from the Each of the positive electrode and the negative electrode is manufactured in a square shape so that remaining three sides except for one side facing the fold lines are opened.

8 Claims, 11 Drawing Sheets

(56) References Cited

U.S. PATENT DOCUMENTS

| | | | |
|---|---|---|---|
| 2009/0165936 A1* | 7/2009 | Sakata | H01M 10/0431 |
| | | | 156/227 |
| 2011/0143189 A1 | 6/2011 | Kim et al. | |
| 2011/0274960 A1 | 11/2011 | Ahn | |
| 2012/0064382 A1 | 3/2012 | Ahn | |
| 2012/0110836 A1 | 5/2012 | Oh et al. | |
| 2012/0121967 A1 | 5/2012 | Nakamura et al. | |
| 2013/0236767 A1 | 9/2013 | Nishikawa et al. | |
| 2014/0050957 A1 | 2/2014 | Yang | |
| 2014/0230239 A1* | 8/2014 | Sato | H01M 10/0583 |
| | | | 29/730 |
| 2015/0333361 A1* | 11/2015 | Sato | H01M 4/043 |
| | | | 29/730 |
| 2019/0252726 A1 | 8/2019 | Eom et al. | |
| 2020/0235434 A1 | 7/2020 | Lee et al. | |

FOREIGN PATENT DOCUMENTS

| | | | |
|---|---|---|---|
| JP | 2010-199281 A | 9/2010 | |
| JP | 2012-113843 A | 6/2012 | |
| JP | 2012-226910 A | 11/2012 | |
| JP | 5203632 B2 * | 6/2013 | |
| JP | 2015-57788 A | 3/2015 | |
| JP | 2017-73337 A | 4/2017 | |
| JP | 2018067396 A * | 4/2018 | |
| JP | 6504012 B2 | 4/2019 | |
| JP | 2019-526903 A | 9/2019 | |
| KR | 10-0921347 B | 10/2009 | |
| KR | 10-2001-0111617 A | 12/2011 | |
| KR | 10-2012-0026266 A | 3/2012 | |
| KR | 10-2012-0060325 A | 6/2012 | |
| KR | 10-1152552 B | 6/2012 | |
| KR | 10-1156344 B | 6/2012 | |
| KR | 10-2013-0075406 A | 7/2013 | |
| KR | 10-2013-0101101 A | 9/2013 | |
| KR | 10-2014-0014839 A | 2/2014 | |
| KR | 10-2014-0016723 A | 2/2014 | |
| KR | 10-2014-0035646 A | 3/2014 | |
| KR | 10-2015-0089164 A | 8/2015 | |
| KR | 10-1553542 B | 9/2015 | |
| KR | 10-2017-0063130 A | 6/2017 | |
| WO | WO-2014017864 A1 * | 1/2014 | H01M 10/0459 |
| WO | WO 2015/162697 A1 | 10/2015 | |

OTHER PUBLICATIONS

Kikuchi, Lithium ion secondary battery, (JP 2018067396A) Apr. 26, 2018 (Year: 2018).*

Shibuya, Non-aqueous electrolyte battery (JP 5203632 B2), Jun. 5, 2013 (Year: 2013).*

Extended European Search Report for European Application No. 20935560.1, dated Jun. 17, 2024.

International Search Report (PCT/ISA/210) issued in PCT/KR2020/018748 dated Apr. 6, 2021.

European Communication pursuant to Article 94(3) EPC for European Application No. 20935560.1, dated Nov. 5, 2025.

* cited by examiner

41

21

10

50b
50a }50

——————— Portion where all electrodes are opened

— — — — Portion where half of electrodes are opened

Portion where all electrodes are opened

Portion where half of electrodes are opened

SECONDARY BATTERY AND METHOD FOR MANUFACTURING THE SAME

CROSS-REFERENCE TO RELATED APPLICATION

The present application claims the benefit of the priority of Korean Patent Application No. 10-2020-0056068, filed on May 11, 2020, which is hereby incorporated by reference in its entirety.

TECHNICAL FIELD

The present invention relates to a method for manufacturing a secondary battery and a secondary battery that is capable of being applied to the manufacturing method, and more particularly, to a method for manufacturing a secondary battery, which is disposed toward a gas pocket part of a pouch, in which an electrode has as many openings as possible, to improve a gas discharge effect, and a secondary battery to which the manufacturing method is capable of being applied.

BACKGROUND ART

Recently, with the rapid development of the electric, electronic, telecommunication and computer industries, the demand for high performance and high safety batteries is gradually increasing. Particularly, as electronic devices are becoming more compact, thinner and lighter, the demands for miniaturization and thinning of batteries is gradually increasing. In response to these demands, a lithium secondary battery with a high energy density is drawing the most attention.

Lithium batteries have advantages of long lifespan and large capacity and are widely used in portable electronic devices. The lithium batteries comprise lithium metal batteries and lithium ion batteries, which use a liquid electrolyte, and lithium polymer batteries using a polymer solid battery depending on types of electrolytes.

In addition, lithium secondary batteries are classified into a prismatic battery using a prismatic can, a cylindrical battery using a cylindrical can, and a pouch-type battery using a pouch according to types of exteriors that seal an electrode assembly.

In the pouch-type battery, the pouch comprises a body part, in which an electrode assembly and an electrolyte are embedded, and a gas pocket part that is expanded to one side from the body part and is opened to allow a gas to be introduced and discharged. The gas pocket part is a portion at which the gas is collected during an activation process of performing initial charging and discharging and a degassing process performed after the activation process. When the degassing is completed, the portion may be cut to be removed, and a cut portion between the gas pocket part and the body part is sealed by applying heat and a pressure. Alternatively, sealing is performed by the heat and pressure before the body part and the gas pocket part are cut, and then cutting is performed after the sealing.

Also, as is known, the electrode assembly inserted into the pouch-type battery is classified into a winding type electrode assembly in which the separator is stacked between the negative electrode and the positive electrode and then wound to manufacture an electrode assembly, a stacking type electrode assembly in which each of a negative electrode and a positive electrode is cut by a desired width and length, and then, the negative electrode, the separator, the positive electrode are repeatedly stacked to form an electrode assembly, and a stack and folding type electrode assembly in which unit cells are placed parallel to each other on a folding separator and then folded from one side to manufacture an electrode assembly.

Referring to FIG. 1a, which shows a state in which the stack and folding type electrode assembly is manufactured, the stack and folding type electrode assembly 1 may be manufactured by folding a folding separator 2 from one side after a plurality of unit cells 3 are placed side by side on the folding separator 2 at a predetermined interval.

However, in the case of this structure, only a side, to which an electrode tab protrudes, and an opposite side are opened (only one side of each of a negative electrode and a positive electrode is opened), and the folded side surface is closed by the folding separator 2. That is, based on the rectangular electrode assembly, a short side at which the electrode tab protrudes is opened, but a long side perpendicular to the short side is closed.

Also, as illustrated in FIG. 1b that shows a state in which the electrode assembly is embedded in the pouch, the electrode assembly 1 is embedded in a body part 4a of the pouch 4, and then, an electrolyte is injected into the body part 4a so that the electrode assembly is impregnated in the electrolyte. When the electrolyte is injected as described above, the pouch is sealed by bonding a portion, into which the electrode assembly 1 is inserted, through thermal fusion.

Also, after an aging process is performed for stabilization, a charging/discharging process is performed to activate the battery. During the charging and discharging process, since a gas is generated inside the pouch, degassing is performed to discharge the gas generated therein.

In the degassing process, after inserting the body part 4a between an upper mold (not shown) and a lower mold (not shown), a predetermined pressure is vertically applied to the body part 4a to allow the gas generated in the body part 4a to move to a gas pocket part 4b, and simultaneously, a gas inhaler is inserted into the gas pocket part 4b to inhale the gas.

After the degassing process is performed, a portion to be cut between the gas pocket part 4b and the body 4a is sealed, and the gas pocket part 4b is cut and discarded to manufacture a secondary battery.

As illustrated in FIG. 1b, as described above, the electrode assembly 1 manufactured in the stack and folding manner has a structure in which a long side facing the gas pocket part 4b is closed, but a short side perpendicular to the gas pocket part 4b is opened. Thus, there is a problem in that efficiency of the degassing process is deteriorated because the gas generated in the body part 4a does not move smoothly to the gas pocket 4b.

Also, if the gas is not normally discharged to remain in the body part 4a, swelling, lithium precipitation, etc. may occur, and also, the electrode assembly is deformed and deteriorated in performance.

DISCLOSURE OF THE INVENTION

Technical Problem

Accordingly, a main object of the present invention for solving the above problems is to provide a method for manufacturing a secondary battery, which is capable of smoothly discharging a gas during an activation process and a degassing process, and a secondary battery to which the above manufacturing method is capable of being applied.

Technical Solution

The present invention for achieving the above object provides a degassing method for a secondary battery and a secondary battery to which the degassing method is applied.

A method for degassing a secondary battery according to the present invention comprises: an electrode assembly providing step of manufacturing an electrode assembly having a stacked structure in which a negative electrode, a first layer of a separator, a positive electrode, and a second layer of the separator are repeated by alternately placing the positive electrode and the negative electrode between the layers of the separator, forming fold lines on the separator at predetermined intervals, and folding the separator in a zigzag shape along a vertical direction by the fold lines to form a plurality of individual layers, each of the plurality of individual layers having a first side formed by one of the plurality of fold lines and three open sides; an insertion step of inserting the electrode assembly into a pouch; and a degassing step of discharging a gas from the pouch, wherein, in the electrode assembly providing step, each of the positive electrode and the negative electrode is manufactured in a rectangular shape so that a first side faces the first side of an individual layer of the plurality of individual layers.

In the electrode assembly providing step, a negative electrode tab protruding from the negative electrode and a positive electrode tab protruding from the positive electrode may be disposed to protrude from the separator in opposite directions.

In the electrode assembly providing step, each of the positive electrode and the negative electrode may have two short sides, and two long sides, and each of the plurality of fold lines of the separator may have a length greater than a length of the short side of each of the positive electrode and the negative electrode and less than a length of the long side of each of the positive electrode and the negative electrode, wherein one of the short sides of each of the positive electrode and the negative electrode may be inserted between the individual layers of the separator to face the fold line of the separator so that both of the long sides of each of the positive electrode and the negative electrode are opened.

In the electrode assembly providing step, a negative electrode tab protruding from the negative electrode and a positive electrode tab protruding from the positive electrode may be disposed to protrude from the separator in a same direction.

In the electrode assembly providing step, each of the positive electrode and the negative electrode may have two short sides, and two long sides, and each of the plurality of fold lines of the separator may have a length greater than a length of the long side of each of the positive electrode and the negative electrode, wherein one of the long sides of each of the positive electrode and the negative electrode may be inserted between the individual layers of the separator to face the fold line of the separator so that all both the short sides of each of the positive electrode and the negative electrode are opened.

The pouch may comprise a body part into which the electrode assembly is inserted and a gas pocket part communicating with the body part and extending from one side of the body part, wherein, in the insertion step, one of the long sides of each of the positive electrode and the negative electrode may be inserted to face the gas pocket part.

In the insertion step, the negative electrode may be opened toward the gas pocket part at the long sides of the electrode assembly, which face the gas pocket part.

The electrode assembly providing step may comprise: a support bar insertion step of inserting a plurality of support bars so that a first surface and a second surface of the separator are alternately disposed at a predetermined interval; an individual layer formation step of allowing the support bar disposed to face the first surface of the separator and the support bar disposed to face the second surface of the separator to move in directions crossing each other so as to form the layers of the separator; an electrode insertion step of alternately inserting the positive electrode and the negative electrode between the layers of the separator; and a pulling step of pulling both ends of the separator at a predetermined pressure when the electrodes are inserted.

Furthermore, the present invention may additionally provide a secondary battery to which the degassing method as described above is capable of being applied.

A secondary battery according to the present invention comprises: an electrode assembly having a stacked structure in which a negative electrode, a first layer of a separator, a positive electrode, and a second layer of the separator are repeated by alternately inserting the positive electrode and the negative electrode between the layers of the separator, wherein a plurality of fold lines are formed on the separator at predetermined intervals, and the separator is folded in a zigzag shape along a vertical direction by the fold lines to form individual layers, each of the plurality of individual layers having a first side formed by one of the plurality of fold lines and three open sides; and a pouch comprising a body part into which the electrode assembly is inserted and a gas pocket part communicating with the body part and extending from one side of the body part, wherein each of the positive electrode and the negative electrode is manufactured in a rectangular shape so that a first side faces a fold line of the plurality of fold lines, and the electrode assembly is inserted into the pouch so that a second of the positive electrode or a second side of the negative electrode faces the gas pocket part.

The electrode assembly may be inserted into the pouch so that the second side of the negative electrode faces the gas pocket part.

After a gas is collected in the gas pocket part, the gas pocket part may be cut and separated from the body part.

Advantageous Effects

According to the present invention having the configuration as described above, in the electrode assembly, the negative electrode and the positive electrode may be manufactured in the square shape, but the remaining three sides except for one side may be opened in the separator so that gas is efficiently discharged.

In addition, according to the present invention, since at least one of the negative electrode or the positive electrode has the opened long side to face the gas pocket part of the pouch, the gas may more quickly move to the gas pocket part.

In particular, the long side of the negative electrode having the relatively large gas discharge amount in the positive electrode and the negative electrode may be opened to more improve the gas discharge efficiency.

MODE FOR CARRYING OUT THE INVENTION

Figure 1A:
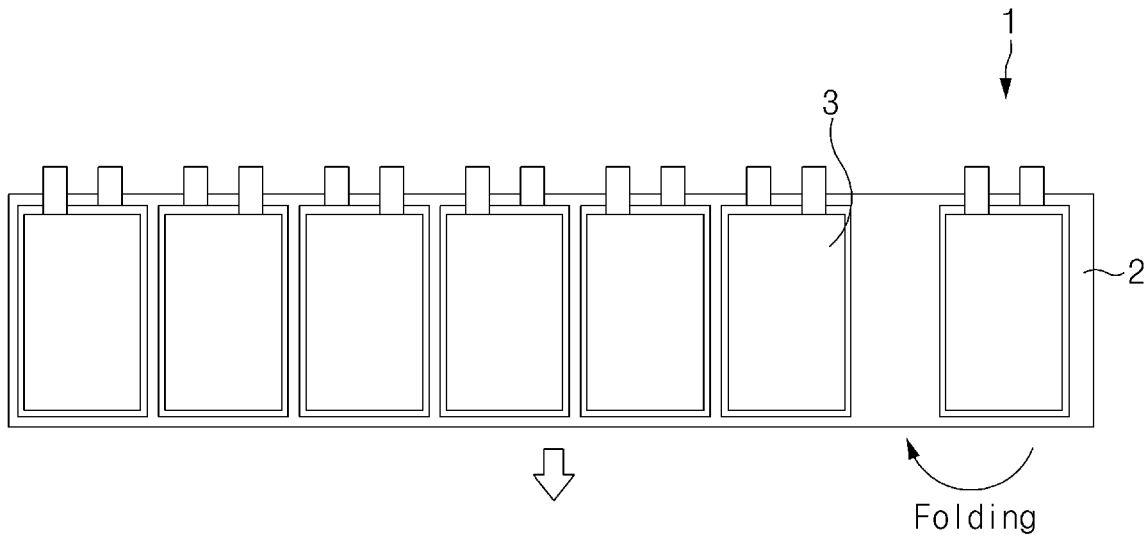
FIG. 1a is a view illustrating a state in which a stack and folding type electrode assembly is manufactured.
Figure 1A:
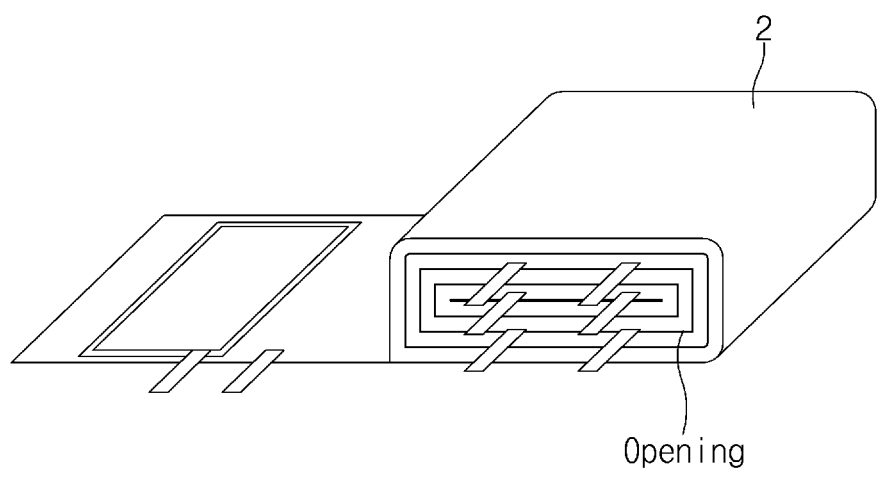
Figure 1B:
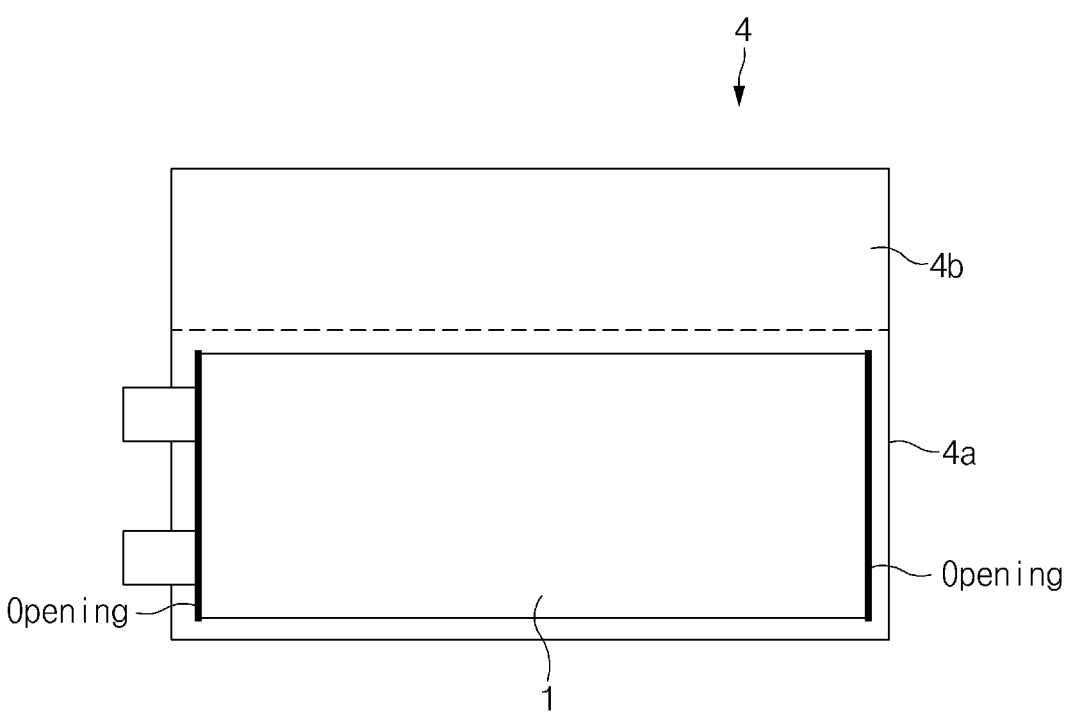
FIG. 1b is a plan view illustrating a see-through state in which the electrode assembly of FIG. 1a is embedded in a pouch.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a method of manufacturing a secondary battery, in which a gas is smoothly discharged during an activation process of performing initial charging and discharging and a degassing process, and a secondary battery to which the manufacturing method is applied. Hereinafter, the present invention will be described in more detail with reference to the accompanying drawings.

Method for Manufacturing Secondary Battery

A manufacturing method according to the present invention comprises an electrode assembly providing step, an insertion step, and a degassing step. The insertion step is a step of inserting an electrode assembly into a pouch, and the degassing step is a step of inhaling a gas moving to a gas pocket part to the outside. Here, since the steps are performed in various manners, detailed descriptions with respect to a specific manner will be omitted.

Embodiment 1

Figure 2:
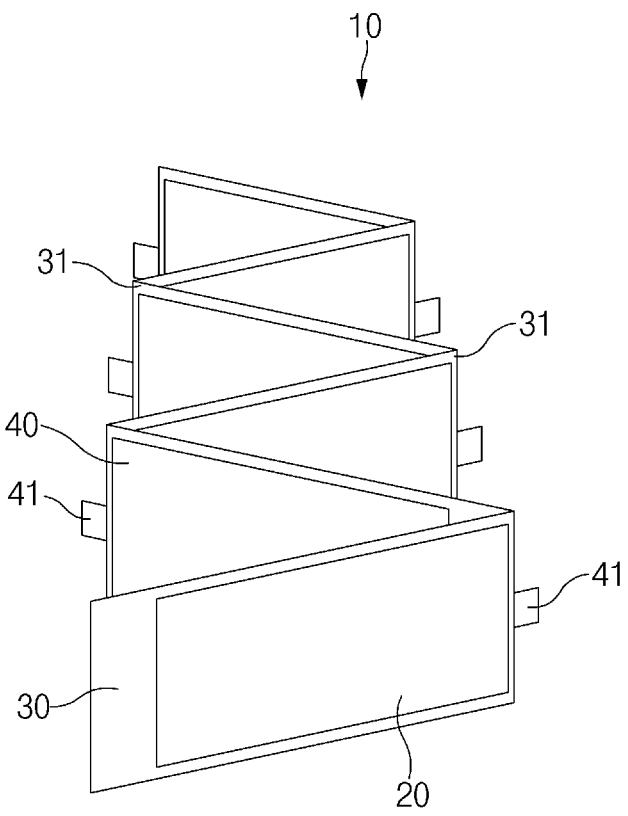
FIG. 2 is a view illustrating a state of being disposed between individual layers of a separator when manufactured in an electrode assembly providing step according to the present invention, i.e., when a positive electrode tab and a negative electrode tab are manufactured to protrude in opposite directions.
Figure 3:
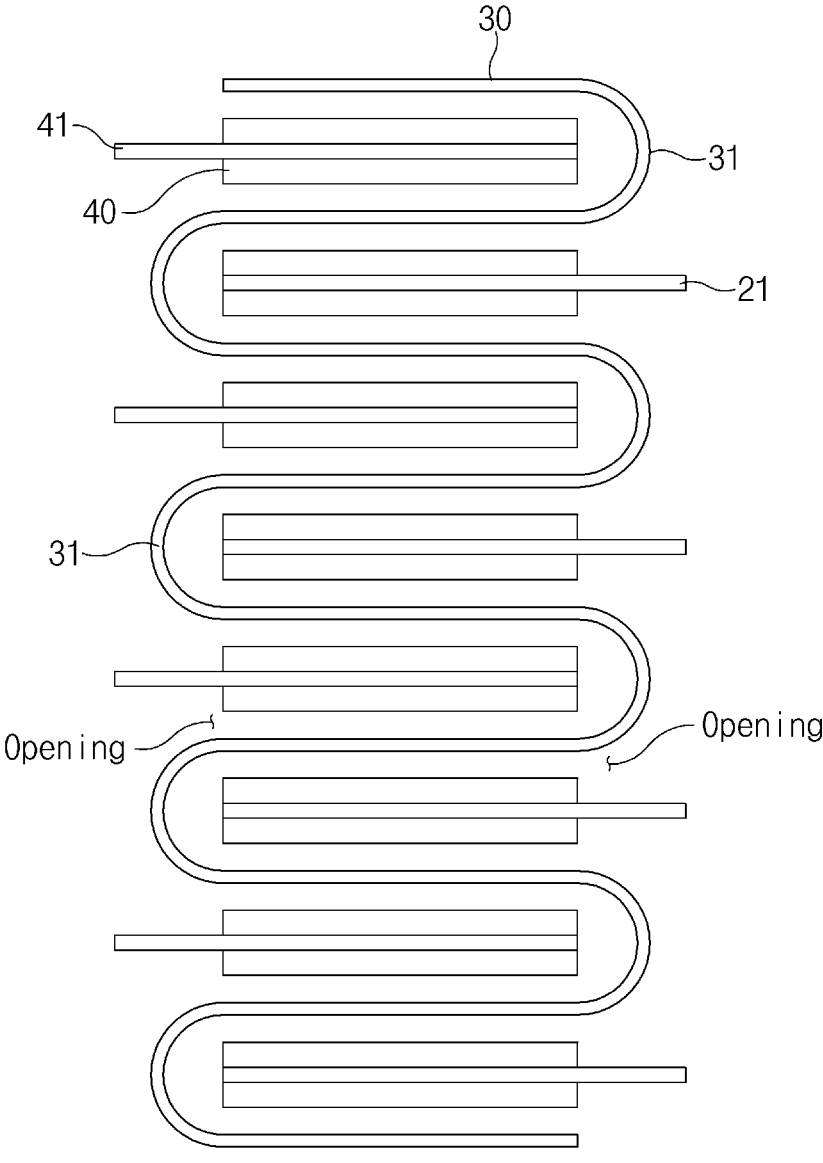
FIG. 3 is a side view illustrating a state when a negative electrode and a positive electrode are disposed between the individual layers of the separator as illustrated in FIG. 2.

Referring to FIGS. 2 and 3 which are perspective and side views illustrating a state of being disposed between individual layers of a separator 30 when manufactured in an electrode assembly providing step according to the present invention, i.e., when a positive electrode tab 21 and a negative electrode tab 41 are manufactured to protrude in opposite directions, in the electrode assembly providing step according to this embodiment, the separator 30 is provided by a predetermined length, and also, the separator 30 is provided to be folded so as to form fold lines 31 with a size of a positive electrode 20 and a negative electrode 40 or an interval that is slightly greater than the size therebetween.

That is, as illustrated in the drawings, the separator 30 may be folded in a zigzag shape along a vertical direction by the fold lines 31 formed at a predetermined interval to form a plurality of individual layers.

Also, as illustrated in FIG. 3, when the positive electrode 20 is inserted between an individual layer of the separator 30, which is disposed at the lowermost side, and a second individual layer above on the lowermost individual layer, the negative electrode 40 is inserted between the second individual layer and a third individual layer, and the positive electrode 20 is inserted again between the third individual layer and a fourth individual layer. For example, the positive electrode 20 and the negative electrode 40 are alternately inserted in this manner to provide the electrode assembly 10 having a stacked structure in which the negative electrode 40, the individual layer of the separator 30, the positive electrode 20, and the individual layer of the separator 30 are repeated.

In the electrode assembly 10, each of the negative electrodes 40 and the positive electrodes 20 is manufactured in a square shape, and since remaining three sides except for one side facing the fold line 31 among four sides formed along a circumference of the electrode assembly 10 are disposed at opened portions of the separator 30, the sides are exposed.

As illustrated in FIGS. 2 and 3, each of the positive electrodes 20 and the negative electrodes 40 has a rectangular shape having two short sides, each of which has a relatively short length, and two long sides, each of which has a relatively long length. The separator 30 is provided so that the fold line 31 has a length greater than a short side each of the positive electrodes 20 and the negative electrodes 40 and less than that of each of the long sides. Also, one of the short sides of the positive electrode 20 and the negative electrode 40 is inserted between the individual layers of the separator to face the fold line of the separator so that both the long sides of the positive electrode 20 and the negative electrode 40 are opened.

For reference, although each of the positive electrode 20 and the negative electrode 40 has the rectangular shape, each of the positive electrode 20 and the negative electrode 40 may have a square shape of which four sides have the same length. Here, when the fold line 31 of the separator 30, which is a portion folded at ends of the positive electrode 20 and the negative electrode 40, is folded, each of the fold lines may have the same length as each of the sides of the positive electrode 20 and the negative electrode 40. However, it is preferable that each of the fold lines 31 has a length greater than that of each of the positive electrode 20 and the negative electrode 40 to prevent the electrode assembly from being biased to be exposed.

Figure 4:
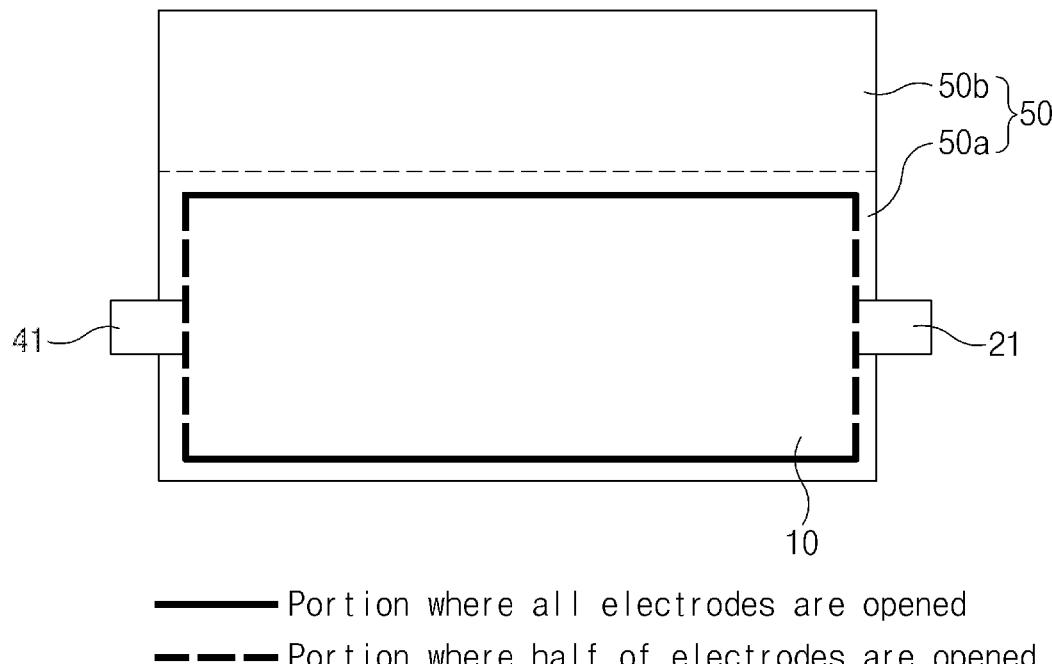
FIG. 4 is a plan view illustrating a see-through state when the electrode assembly stacked as illustrated in FIGS. 2 and 3 is inserted into a body part of the pouch.

Therefore, as illustrated in FIG. 4 that illustrates a see-through state when the electrode assembly 10 according to Embodiment 1 is inserted into a body part 50a of a pouch 50, when the electrode assembly 10 according to Embodiment 1 is inserted into the pouch 50, openings of the separator 30 are formed in all both the long sides of the positive electrode 20 and the negative electrode 40 (since both the long sides of the positive electrode and both the long sides of the negative electrode are not covered by the separator), a gas may more smoothly move to the gas pocket part 50b of the pouch 50. That is to say, since the openings of the separator 30 are formed toward the gas pocket part at the sides of the positive electrode 20 and the negative electrode 40, which face the gas pocket part, the gas may be more smoothly move.

Embodiment 2

As illustrated in FIGS. 2 and 3, a positive electrode tab 21 and a negative electrode tab 41 may be manufactured to protrude in opposite directions, but the positive electrode tab 21 and the negative electrode tab 41 may also be manufactured to protrude in the same direction.

Figure 5:
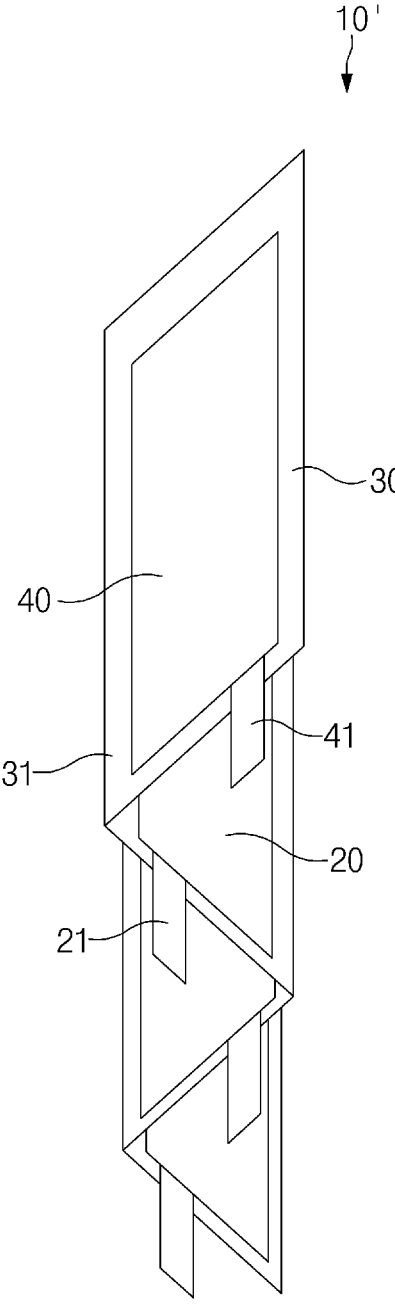
FIG. 5 is a view illustrating a state of being disposed between the individual layers of the separator when manufactured in the electrode assembly providing step according to the present invention, i.e., when the positive electrode tab and the negative electrode tab are manufactured to protrude in the same direction.
Figure 6:
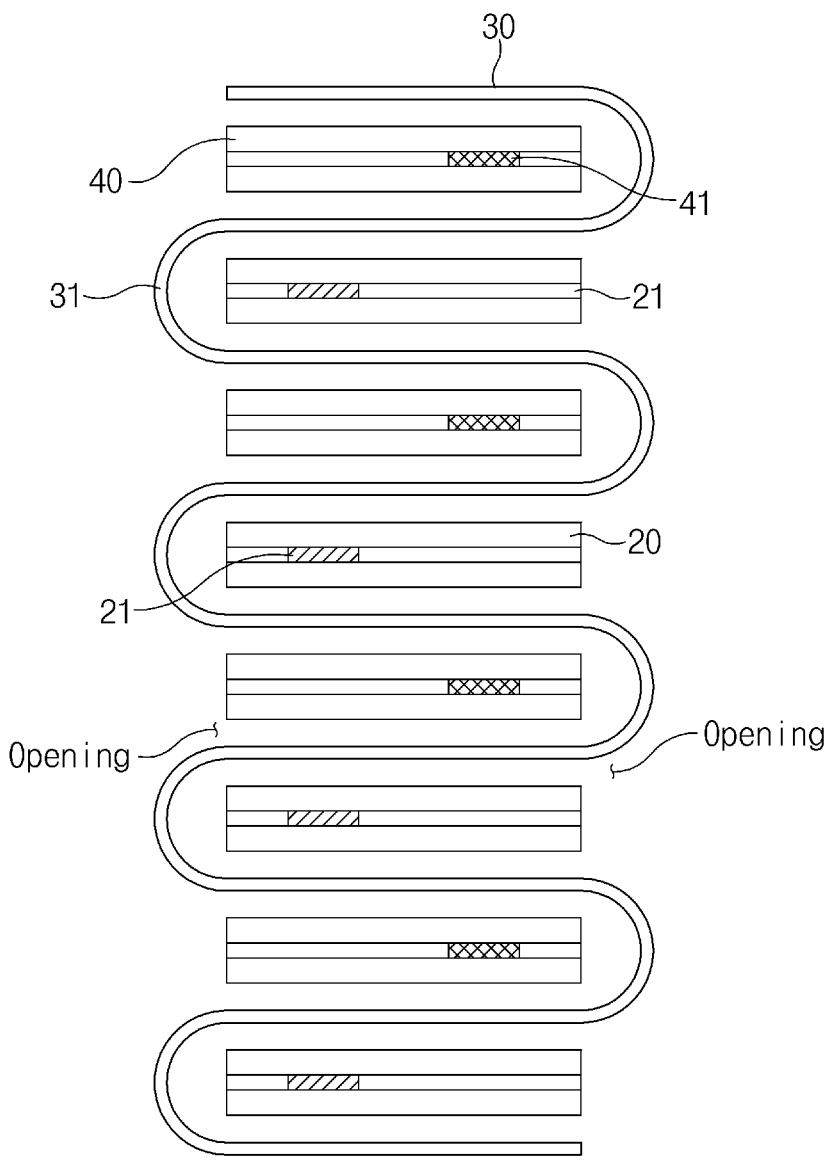
FIG. 6 is a side view illustrating a state when the negative electrode and the positive electrode are disposed between the individual layers of the separator as illustrated in FIG. 5.

That is, as illustrated in FIGS. 5 and 6, which are perspective and side views illustrating a state in which the positive electrode tab 21 and the negative electrode tab 41 are disposed between individual layers of a separator 30 to protrude in the same direction when manufactured in an electrode assembly providing step, the positive electrode tab 21 and the negative electrode tab 41 may be disposed in the same direction according to a direction in which the positive electrode 20 and the negative electrode 40 are inserted between the adjacent individual layers of the separator 30.

As illustrated in FIGS. 5 and 6, even in an electrode assembly 10' according to this embodiment, each of a positive electrode 20 and a negative electrode 40 has a rectangular shape having two short sides, each of which has a relatively short length, and two long sides, each of which has a relatively long length.

As mentioned above, although each of the positive electrode 20 and the negative electrode 40 has the rectangular shape, each of the positive electrode 20 and the negative electrode 40 may have a square shape of which four sides have the same length.

However, unlike Embodiment 1, the separator 30 is configured so that a fold line 31 has a length greater than each of the long sides of the positive electrode 20 and the negative electrode 40, and one of the long sides of the positive electrode 20 and the negative electrode 40 is inserted between the individual layers of the separator 30 to face the fold line 31 of the separator 30 so that all both short sides of the positive electrode 20 and the negative electrode 40 are opened. When each of the negative electrode 40 and the positive electrode 20 has a square shape, the fold line 31 of the separator 30 has a length that is equal to or greater than that of each of the sides of the negative electrode 40 and the positive electrode 20.

Figure 7:
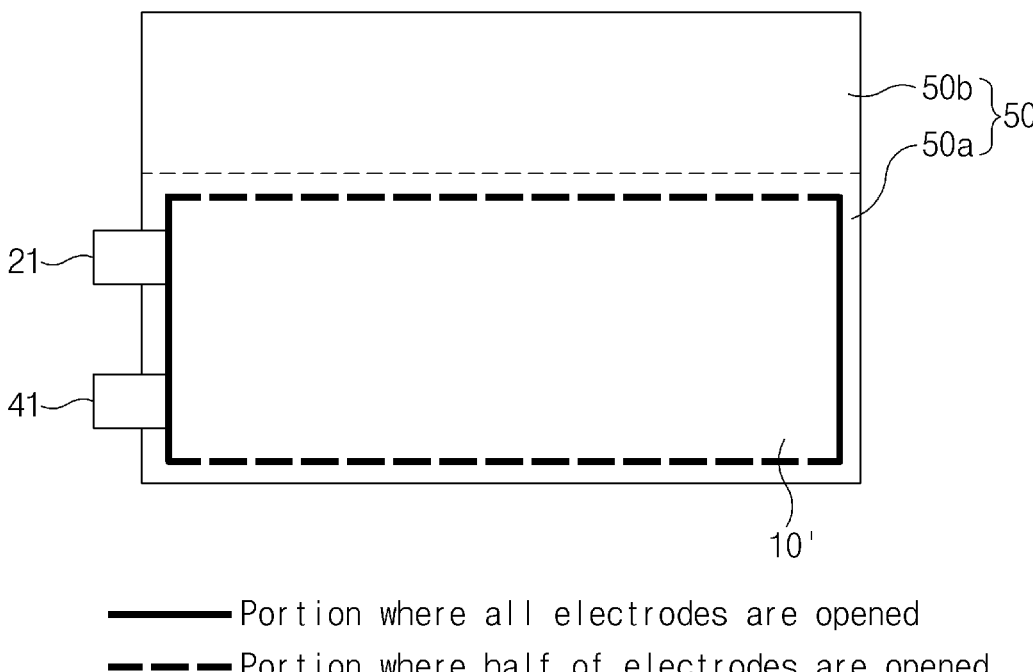
FIG. 7 is a plan view illustrating a see-through state when the electrode assembly stacked as illustrated in FIGS. 5 and 6 is inserted into the body part of the pouch.

Therefore, as illustrated in FIG. 7 that illustrates a see-through state when an electrode assembly 10' according to Embodiment 2 is inserted into a body part 50a of a pouch 50, when the electrode assembly 10' according to Embodiment 2 is inserted into the pouch 50, openings of a separator 30 are formed in all both short sides of a positive electrode 20 and a negative electrode 40, but one of the positive electrode 20 and the negative electrode 40 is covered by a fold line 31 of the separator 30 in a direction of a gas pocket part 50b at both the long sides. That is to say, the openings of the separator 30 are formed in a side, on which the electrode tab is disposed, and a side facing the side on which the electrode tab is disposed, but one of the positive electrode 20 and the negative electrode 40 is covered by the fold line 31 in the direction of the gas pocket part 50b at two sides perpendicular to the side, on which the electrode tab is disposed.

Figure 8:
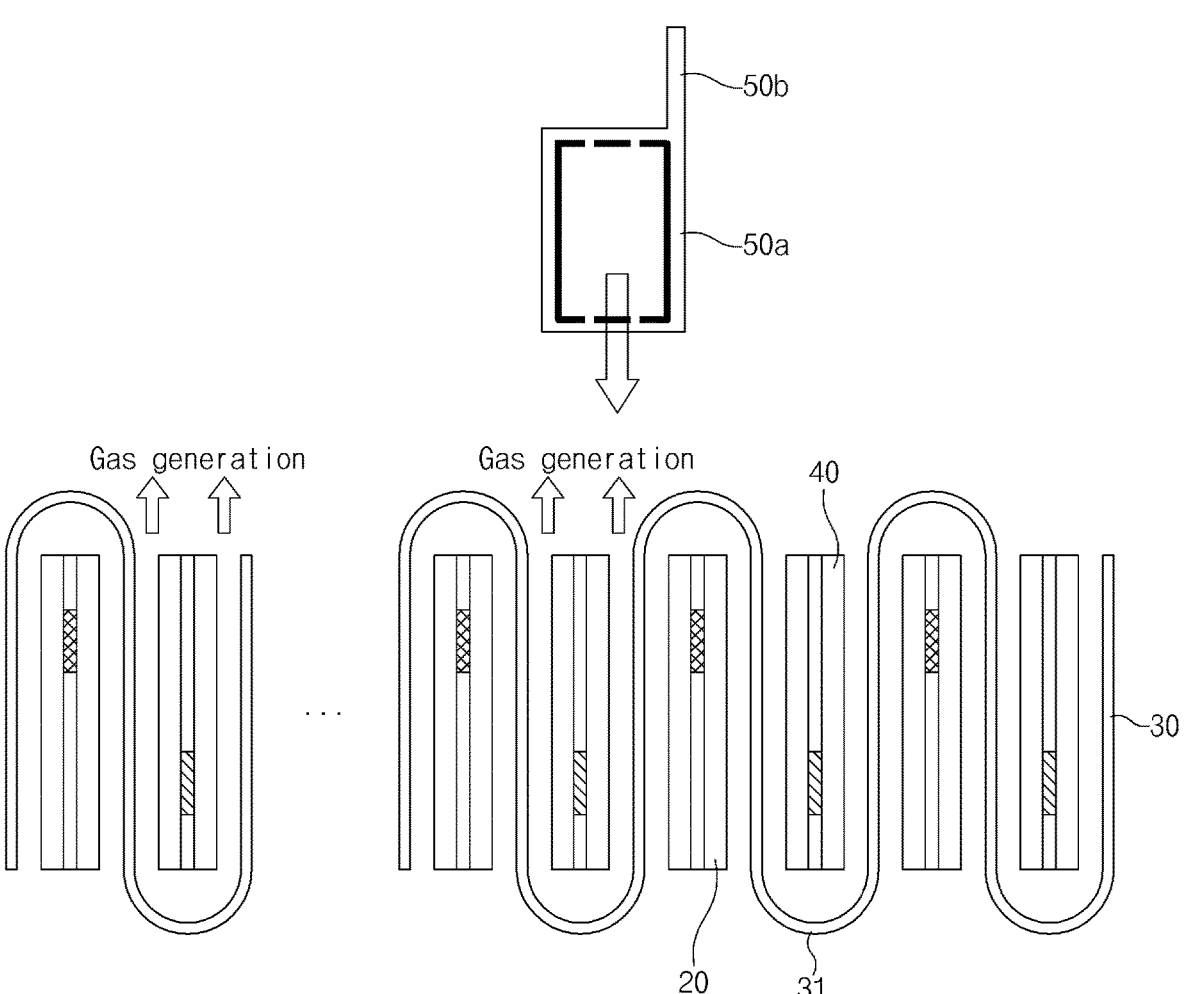
FIG. 8 is a view illustrating a state in which one of sides of the negative electrode is opened, and the opened corresponding side is disposed toward a gasket part of the pouch.

That is, as illustrated in FIG. 8, which illustrates a state in which one of the long sides of the negative electrode 40 is opened, and the opened long side is disposed toward the gas pocket part 50b of the pouch 50, in FIG. 8, a direction indicated by a 'gas generation arrow' is a direction toward the gas pocket part when the electrode assembly according to Embodiment 2 is inserted into a body part. Here, the negative electrode 40 is opened in the direction toward the gas pocket part 50b, but the opposite side thereof is blocked by the fold line 31 of the separator 30. On the other hand, the positive electrode 20 is blocked in the direction toward the gas pocket part 50b, but the opposite side is opened.

The pouch 50 has a structure that extends from the body part 50a, into which the electrode assembly 10' is inserted, to one side of the gas pocket part 50b that communicates with the body part 50a and extends to one side of the body part 50a. Thus, the electrode assembly 10' manufactured as described above may be selectively mounted in the direction, in which the negative electrode 40 is opened, toward the gas pocket part 50b or in the direction, in which the positive electrode 20 is opened, toward the gas pocket part 50b.

However, during an activation process, more gas generated by water decomposition or film formation inside the electrode assembly 10' is generated in the negative electrode 40 than in the positive electrode 20. That is, since the gas generated during the activation process is mainly generated on a surface of the negative electrode 40 due to the film formation on the negative electrode 40, it is considered that gas discharge from the negative electrode 40 is more important than gas discharge from the positive electrode 20.

Therefore, if the electrode assembly 10' having the same configuration as in Embodiments 2 is provided in the electrode assembly providing step (S10), in the insertion step (S20) of the degassing method according to the present invention, it is more preferable that the electrode assembly 10' is inserted into the body part 50a in the direction, in which the negative electrode 20 is opened toward the gas pocket part 50b at the long side of the electrode assembly 10' (or at one side at which one of the negative electrode and the positive electrode is opened, and the other is blocked in the case of the square shape) when compared to the opposite case.

Figure 9:
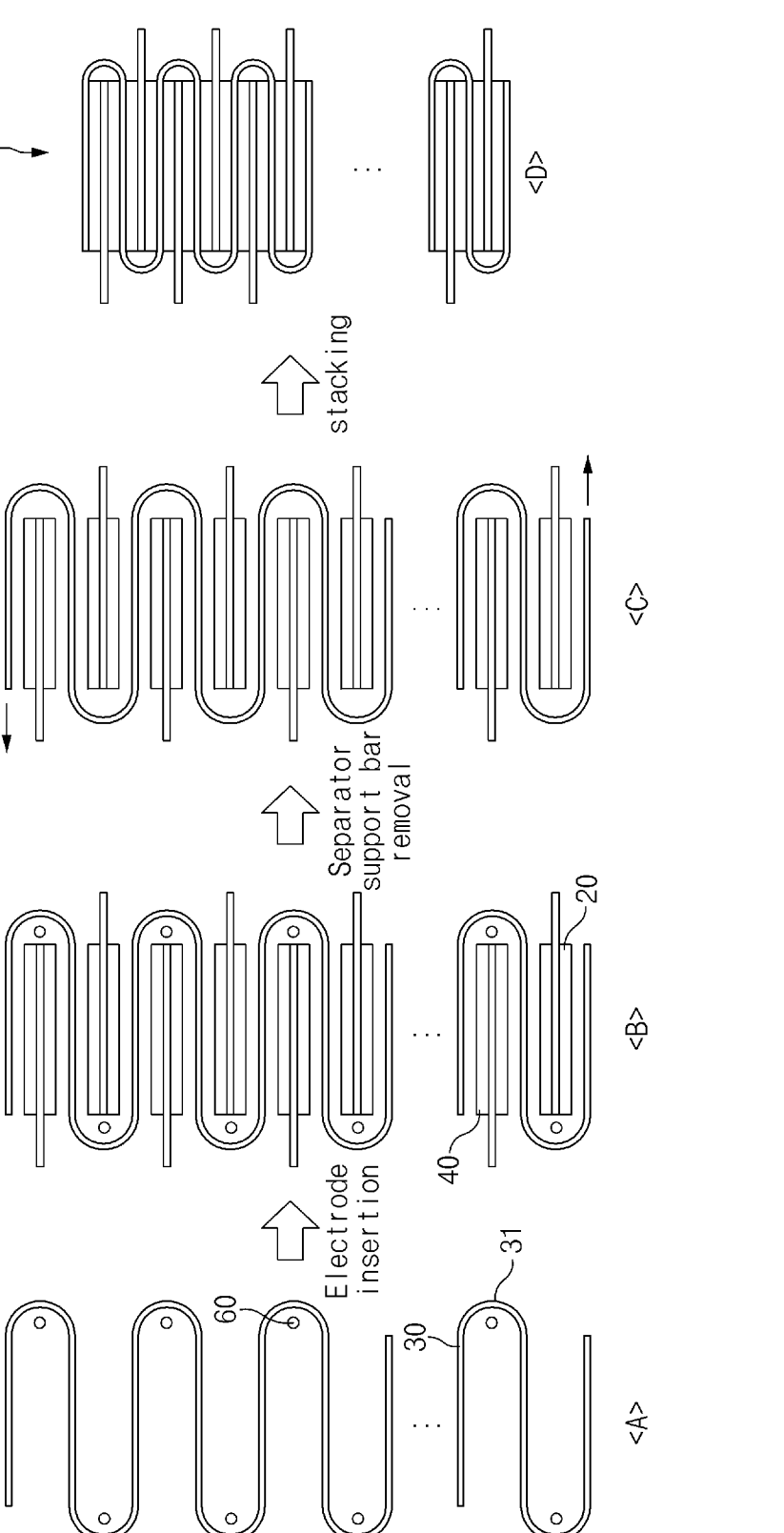
FIG. 9 is a simplified view illustrating states in which the electrode assembly is manufactured in the electrode assembly providing step (S10) according to the present invention.

In the electrode assembly providing step (S10), detailed steps of interposing the negative electrode 40 and the positive electrode 20 between the individual layers of the separator 30 may be additionally provided. That is, referring to FIG. 9, which simplifies and illustrates states in which the electrode assembly is manufactured in the electrode assembly providing step (S10) according to the present invention, when the separator 30 is provided by a predetermined length, a support bar insertion step (S11) of inserting a plurality of support bars 60 so that one surface and the other surface of the separator 30 are alternately disposed at a predetermined interval is performed.

Also, an individual layer formation step (S12) of allowing the support bar 60 disposed to face the one surface of the separator 30 and the support bar 60 disposed to face the other surface of the separator 30 to move in directions crossing each other, thereby forming individual layers on the separator 30 is performed.

Thus, when the plurality of individual layers are formed in a vertical direction, an electrode insertion step (S13) of alternately inserting the positive electrode 20 and the negative electrode 40 between the individual layers of the separator 30 adjacent to each other is performed.

Also, after the support bars 60 are removed, a pulling step (S14) of pulling both ends of the separator 30 at a predetermined pressure in the state in which the electrodes (the positive and negative electrodes) are inserted is performed, and thus, the separator 30 has a structure in which the negative electrode 40 and the positive electrode 20 are stacked in the state in which predetermined tension is applied. Finally, both ends of the separator 30 are cut at an appropriate position.

In the degassing method according to the present invention having the configuration as described above, in the electrode assembly, the negative electrode and the positive electrode may be manufactured in a rectangular shape, but the remaining three sides except for one side may be opened in the separator so that gas is efficiently discharged.

Furthermore, according to the present invention, at least one of the negative electrode 40 or the positive electrode 20 may be disposed to face the gas pocket part 50b of the pouch 50 so that the gas more quickly moves to the gas pocket part 50b.

In particular, the long side of the negative electrode 40 having a relatively large gas discharge amount in the positive electrode 20 and the negative electrode 40 may be opened to more improve gas discharge efficiency.

Experiment

In Manufacturing Example 1, Manufacturing Example 2, and Comparative Example 1 described below, a positive electrode 20, a negative electrode 40, and an electrolyte, which are manufactured in the same manner, are provided.

In the positive electrode 20, positive active material slurry was manufactured by adding 40 parts by weight of solid at a ratio of 90:5.5 (wt %) based on parts by weight, at which a ternary active material ($Li(Ni_{0.5}Mn_{0.3}Co_{0.2})O_2$) as a positive electrode active material, carbon black as a conductive material, polyvinylidene fluoride (PVDF) as a binder are mixed in 100 parts by weight of N-methyl-2-pyrrolidone (NMP). The positive electrode active material slurry was applied to a positive electrode collector (aluminum thin film)

20a having a thickness of 100 μm and then was dried. Then, roll press was performed to manufacture the positive electrode.

In the negative electrode 40, negative active material slurry was manufactured by adding 100 parts by weight of solid at a ratio of 90:5:2:3 (wt %) based on parts by weight, at which natural graphite and $SiO_x$ (0<x<1) as negative active materials, PVDF as a binder, and carbon black as a conductive material are mixed in 100 parts by weight of NMP. The negative electrode active material slurry was applied to a negative electrode collector (copper thin film) 40a having a thickness of 90 μm and then was dried. Then, roll press was performed to manufacture the negative electrode.

Ethylene carbonate (EC) and ethyl methyl carbonate (EMC) were mixed at a ratio of 30:70 (vol %) based on volume percentage and then dissolved so that LiPF6 has a concentration of 1M to manufacture an organic mixture. Then, 1 part by weight of vinylene carbonate (VC) and 1 part by weight of 1,3-propenesultone (PS) were added to manufacture the electrolyte.

Manufacturing Example 1

An electrode assembly having the same structure as in Embodiment 1 was manufactured using a negative electrode 40 and a positive electrode 20, which are manufactured in the same manner as described above, and after the electrode assembly was embedded in a body part 50a of a pouch, the above-described electrolyte was injected.

Manufacturing Example 2

An electrode assembly having the same structure as in Embodiment 2 was manufactured using a negative electrode 40 and a positive electrode 20, which are manufactured in the same manner as described above, and after the electrode assembly was embedded in a pouch, the above-described electrolyte was injected. However, the electrode assembly was inserted into a body part 50a so that an electrode that is opened in a direction toward a gas pocket part 50b is the positive electrode 20, and the negative electrode 40 is closed in the direction toward the gas pocket part 50b.

Manufacturing Example 3

An electrode assembly having the same structure as in Embodiment 2 was manufactured using a negative electrode 40 and a positive electrode 20, which are manufactured in the same manner as described above, and after the electrode assembly was embedded in a pouch, the above-described electrolyte was injected. However, the electrode assembly was inserted into a body part 50a so that an electrode that is opened in a direction toward a gas pocket part 50b is the negative electrode 40, and the positive electrode 20 is closed in the direction toward the gas pocket part 50b.

Comparative Example 1

A stack and folding type electrode assembly was manufactured using a negative electrode and a positive electrode in the same manner as described above. Here, tabs of the positive electrode and the negative electrode were disposed in different directions. After the electrode assembly is embedded in a pouch 50, an electrolyte as described above was injected.

Comparative Example 2

A stack and folding type electrode assembly was manufactured using a negative electrode and a positive electrode in the same manner as described above. Here, tabs of the positive electrode and the negative electrode were disposed in the same direction. After the electrode assembly is embedded in a pouch 50, an electrolyte as described above was injected.

Experimental Method

Charging under constant current/constant voltage conditions and 0.05 C cut-off charging were performed up to a voltage of 4.35V at 0.8 C-rate in each of secondary batteries according to Manufacturing Examples 1 to 3 and Comparative Example 1. After sealing a gap between the gas pocket 50b of the pouch 50 and the body part 50a, an amount of gas in the gas pocket 50b was measured. Here, a gas generation amount according to Comparative Example 1 was set as a reference value of 100, and an amount of gas in each of the secondary batteries according to the remaining Manufacturing Examples 1 to 3 were shown as a relative percentage.

Table 1 below shows experimental data.

trode 40 and the positive electrode 20 are opened toward the gas pocket part 50b, the lithium precipitation was not observed in the negative electrode. Furthermore, although not described with reference to FIG. 10, even in the structure according to Manufacturing Example 3 having the structure, in which one side of the negative electrode 40 is opened toward the gas pocket part 50b, like Manufacturing Example 3, the lithium precipitation was not observed in each of the negative electrode collector 40a and the positive electrode collector 20a, like Manufacturing Example 1.

On the other hand, in the structure according to Manufacturing Example 2, in which one side of the positive electrode 20 is opened toward the gas pocket part 50b, but one side of the negative electrode 40 is closed in the direction toward the gas pocket part 50b, the precipitation of a relatively small amount of lithium was observed.

However, in the structure according to Comparative Example 1, in which both the negative electrode 40 and the positive electrode 20 are closed in the direction toward the gas pocket part 50b, the precipitation of a relatively large amount of lithium was observed in the negative electrode.

Furthermore, charging under constant current/constant voltage conditions and 0.05 C cut-off charging were per-

TABLE 1

| Type of electrode assembly | Position of electrode tab | Whether opened or not between positive electrode and gas pocket | Whether opened or not between negative electrode and gas pocket | Amount of gas in gas pocket part | Lithium precipitation | Discharge capacity compared to Comparative Example 1 | Capacity retention rate |
|---|---|---|---|---|---|---|---|
| Manufacturing Example 1 | Structure according to Embodiment 1 | Bidirectional | Open | Open | 107.2 | None | 102.1 | 93.6 |
| Manufacturing Example 2 | Structure according to Embodiment 2 | Unidirectional | Open | Close | 105.4 | Small amount generation | 101.4 | 93.1 |
| Manufacturing Example 3 | Structure according to Embodiment 3 | Unidirectional | Close | Open | 110.3 | None | 103.5 | 95.7 |
| Comparative Example 1 | Stack and folding structure according to related art | Bidirectional | Close | Close | 100.0 | Large amount generation | 100 | 87.5 |
| Comparative Example 2 | Stack and folding structure according to related art | Unidirectional | Close | Close | 100.0 | Large amount generation | 100 | 89.2 |

After conducting the above experiment, each secondary battery was disassembled to observe whether lithium is precipitated.

Figure 10:
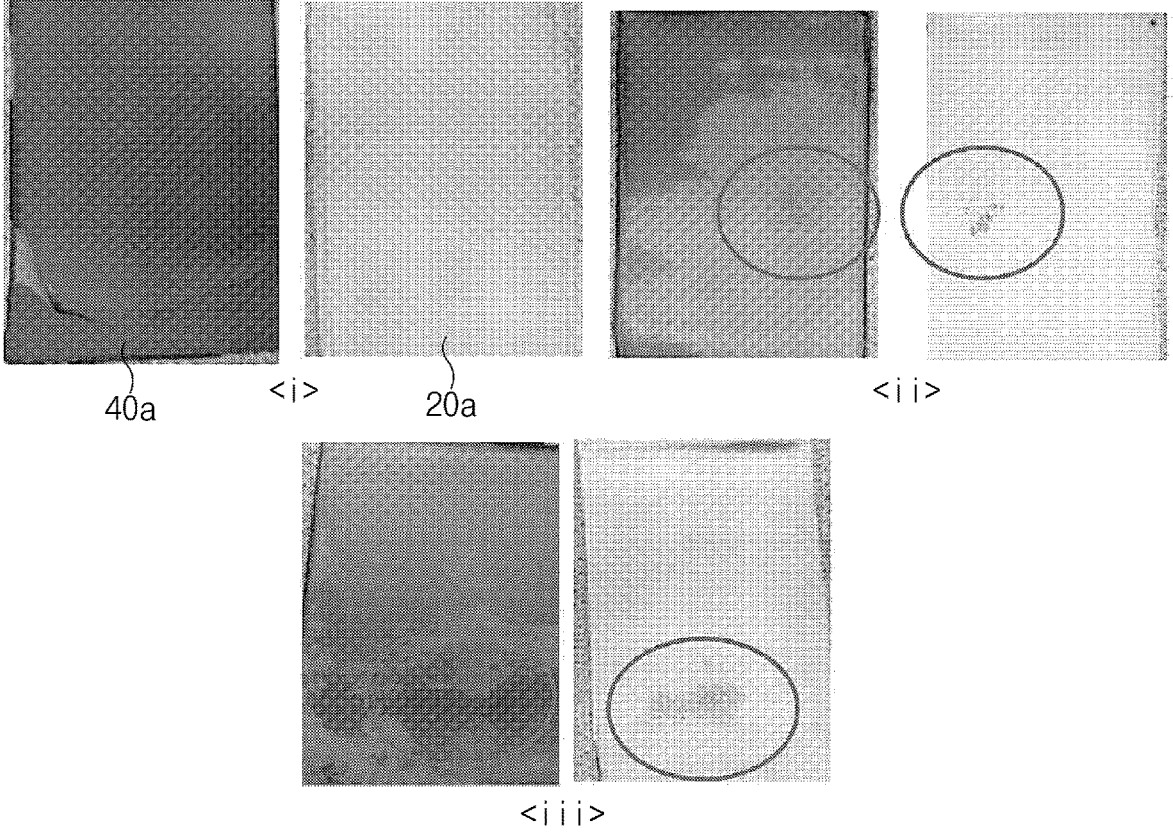
FIG. 10 is a photograph illustrating a state <i> of a disassembled negative electrode of a secondary battery manufactured according to Manufacturing Example 1 of the present invention and a separator facing the negative electrode, a state <ii> in which a disassembled negative electrode of a secondary battery manufactured according to Manufacturing Example 2 of the present invention and a separator facing the negative electrode, and a state <iii> in which a disassembled negative electrode of a secondary battery, in which an electrode assembly according to a related art is mounted, and a separator facing the negative electrode, i.e., photographs illustrating respective states in which lithium precipitation occurs.

FIG. 10 is a photograph illustrating a state <i> of a disassembled negative electrode of a secondary battery manufactured according to Manufacturing Example 1 of the present invention and a separator facing the negative electrode, a state <ii> in which a disassembled negative electrode of a secondary battery manufactured according to Manufacturing Example 2 of the present invention and a separator facing the negative electrode, and a state <iii> in which a disassembled negative electrode of a secondary battery, in which an electrode assembly according to a related art is mounted, and a separator facing the negative electrode.

As illustrated in FIG. 10, in the structure according to Manufacturing Example 1 in which both the negative elecformed up to a voltage of 4.35V at 0.8 C-rate in each of the secondary batteries according to Manufacturing Examples 1 to 3 and Comparative Example 1, and discharging was performed at 0.5 C and 3.0V. Also, each discharge capacity was measured. The discharge capacity according to Comparative Example 1 was set as a reference value of 100, and the rest were shown as a relative ratio.

Thereafter, the charging and discharging by the above method at 60 degrees Celsius was performed as one cycle, and the capacity after 100 cycles was measured as a percentage to an initial cycle capacity.

Analysis of Results

In each of the secondary batteries, since the electrode assembly having the same capacity is mounted in the body part 50b of the pouch 50, an amount of gas generated inside the pouch is the same. Here, in the secondary batteries according to Manufacturing Examples 1 to 3, when an amount of gas moving to the gas pocket part 50*b* is greater than that according to Comparative Example 1, this means that the gas generated inside the body part 50*a* more smoothly moves to the gas pocket part 50*b*.

That is, in the case of Comparative Example 1, this means that more gas remains inside the body part. Even if the residual gas is in a small amount, the residual gas may exist in a state of micro bubbles between the negative electrode and the positive electrode to adversely affect performance and cause the lithium precipitation.

In the case of Manufacturing Examples 1 and 3, in which the gas is discharged relatively smoothly, there was no precipitated lithium. In the case of Manufacturing Example 2, a small amount of lithium was precipitated. In the case of Comparative Examples 1 and 2, a large amount of lithium was precipitated. As described above, this is presumed to be due to the residual gas.

Furthermore, the lithium precipitation affects the discharge capacity. The initial discharge capacity is not substantially different, but the difference is widened in the capacity retention rate after the charging and discharging are performed 100 times. That is, the case of Comparative Example 1, in which the gas remains in the body part 50*a* exhibits a lower capacity retention rate compared to Manufacturing Example 1, and the case of Comparative Example 2 exhibits a lower capacity retention rate compared to Manufacturing Examples 2 and 3. It is seen that the capacity retention rate is greater in an order (order of Manufacturing Example 3 and Manufacturing Example 2), in which the gas is discharged more smoothly.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10, 10': Electrode assembly
20: Positive electrode
30: Separator
31: Fold line
40: Negative electrode
50: Pouch

The invention claimed is:

1. A method for manufacturing a secondary battery, the method comprising:
an electrode assembly providing step of manufacturing an electrode assembly having a stacked structure in which a negative electrode, a first layer of a separator, a positive electrode, and a second layer of the separator are repeated by alternately placing the positive electrode and the negative electrode between the layers of the separator, forming a plurality of fold lines on the separator at predetermined intervals and folding the separator in a zigzag shape along a vertical direction by the fold lines to form a plurality of individual layers, each of the plurality of individual layers having a first side formed by one of the plurality of fold lines and three open sides;
an electrode insertion step of alternately inserting the positive electrode and the negative electrode between the layers of the separator;

a pulling step of pulling terminal ends of the separator in opposite directions with respect to a length of the separator when the electrodes are inserted;
an insertion step of inserting the electrode assembly into a pouch; and
a degassing step of discharging a gas from the pouch,
wherein, in the electrode assembly providing step, each of the positive electrode and the negative electrode is manufactured in a rectangular shape so that a first side faces the first side of an individual layer of the plurality of individual layers.

2. The method of claim 1, wherein, in the electrode assembly providing step, a negative electrode tab protruding from the negative electrode and a positive electrode tab protruding from the positive electrode are disposed to protrude from the separator in opposite directions.

3. The method of claim 2, wherein, in the electrode assembly providing step, each of the positive electrode and the negative electrode has two short sides, and two long sides, and
wherein each of the plurality of fold lines of the separator has a length greater than a length of the short side of each of the positive electrode and the negative electrode and less than a length of the long side of each of the positive electrode and the negative electrode,
wherein one of the short sides of each of the positive electrode and the negative electrode is inserted between the individual layers of the separator to face the fold line of the separator so that both of the long sides of each of the positive electrode and the negative electrode are opened.

4. The method of claim 1, wherein, in the electrode assembly providing step, a negative electrode tab protruding from the negative electrode and a positive electrode tab protruding from the positive electrode are disposed to protrude from the separator in a same direction.

5. The method of claim 4, wherein, in the electrode assembly providing step, each of the positive electrode and the negative electrode has two short sides, and two long sides, and
each of the plurality of fold lines of the separator has a length greater than a length of the long side of each of the positive electrode and the negative electrode,
wherein one of the long sides of each of the positive electrode and the negative electrode is inserted between the individual layers of the separator to face the fold line of the separator so that both of the short sides of each of the positive electrode and the negative electrode are opened.

6. The method of claim 3, wherein the pouch comprises a body part into which the electrode assembly is inserted and a gas pocket part communicating with the body part and extending from one side of the body part,
wherein, in the insertion step, one of the long sides of each of the positive electrode and the negative electrode is inserted to face the gas pocket part.

7. The method of claim 6, wherein, in the insertion step, the negative electrode is opened toward the gas pocket part at the long sides of the electrode assembly, which face the gas pocket part.

8. The method of claim 1, wherein the electrode assembly providing step comprises:
a support bar insertion step of inserting a plurality of support bars so that a first surface and a second surface of the separator are alternately disposed at a predetermined interval; and an individual layer formation step of allowing the support
  bar disposed to face the first surface of the separator
  and the support bar disposed to face the second surface
  of the separator to move in directions crossing each
  other so as to form the layers of the separator,
wherein the pulling step occurs after the plurality of
  support bars are removed.

\* \* \* \* \*